US008843611B2

(12) United States Patent
Kim (10) Patent No.: US 8,843,611 B2
(45) Date of Patent: Sep. 23, 2014

(54) METHOD FOR TRANSMITTING WS MESSAGE TO MULTIPLE RECEIVING NODES AND APPARATUS FOR PROCESSING WS MESSAGE

(75) Inventor: Joo-hyun Kim, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1698 days.

(21) Appl. No.: 11/477,321

(22) Filed: Jun. 30, 2006

(65) Prior Publication Data

US 2007/0022205 A1 Jan. 25, 2007

(30) Foreign Application Priority Data

Jul. 9, 2005 (KR) ........................ 10-2005-0061969

(51) Int. Cl.
*G06F 15/173* (2006.01)
*G06F 15/16* (2006.01)
*G06Q 10/10* (2012.01)

(52) U.S. Cl.
CPC ...................... *G06Q 10/10* (2013.01)
USPC .......................................... 709/224; 709/230

(58) Field of Classification Search
CPC ..... H04L 61/2069; H04L 45/12; H04L 45/02; H04L 45/00; H04L 61/00; H04L 61/20
USPC ........................................................ 709/230
See application file for complete search history.

(56) References Cited

U.S. PATENT DOCUMENTS

| 2002/0046239 | A1 | 4/2002 | Stawikowski et al. |
| 2002/0069278 | A1* | 6/2002 | Forslow ........................ 709/225 |
| 2004/0068586 | A1 | 4/2004 | Xie et al. |
| 2005/0177602 | A1* | 8/2005 | Kaler et al. ................. 707/104.1 |
| 2006/0129655 | A1* | 6/2006 | Schlimmer et al. ........... 709/217 |
| 2006/0233166 | A1* | 10/2006 | Bou-Diab et al. ............ 370/389 |

FOREIGN PATENT DOCUMENTS

KR 10-2004-0039039 A 5/2004
WO WO 2004/034270 A1 4/2004

OTHER PUBLICATIONS

Explicit Multicast Extension (Xcast+) for Efficient Multicast Packet Delivery, Author: Myung-Ki Shin, Yong-Jin Kim, Ki-Shik Park, and Sang-Ha Kim, ETRI Journal, vol. 23, No. 4, Dec. 2001.*

* cited by examiner

*Primary Examiner* — Noel Beharry
(74) *Attorney, Agent, or Firm* — Sughrue Mion, PLLC (57) ABSTRACT

A method for transmitting a WS message and an apparatus for processing a WS message, the method includes providing data in the form of a WS message, addressing the WS message to a plurality of receiving nodes, and transmitting the addressed WS message to the plurality of receiving nodes.

21 Claims, 12 Drawing Sheets

```
<S:Envelope xmlns:S="http://www.w3.org/2003/05/soap-envelope"
         xmlns:wsa="..."xmlns:home"...">
   <S:Header>
      ...
                                240
      <wsa:receiver>
      <wsa:ReplyTo>http://rm.samsung.co.kr/device1</wsa:ReplyTo>
210   <wsa:To>http://home.yourhome.samsung.co.kr/device1</wsa:To>
      <home:device1>state</home:device1>
      ...
      </wsa:receiver>  250
      <wsa:receiver>
      <wsa:ReplyTo>http://rm.samsung.co.kr/device2</wsa:ReplyTo>
220   <wsa:To>http://home.yourhome.samsung.co.kr/device2</wsa:To>
      <home:device2>state</home:device2>
      ...
      </wsa:receiver>
      <wsa:receiver>
      <wsa:ReplyTo>http://rm.samsung.co.kr/device3</wsa:ReplyTo>
230   <wsa:To>http://home.yourhome.samsung.co.kr/device3</wsa:To>
      <home:device3>state</home:device3>
      ...
      </wsa:receiver>
      ...
   </S:Header>
   <S:Body>
      ...
   </S:Body>
</S:Envelope>
```

```
<S:Envelope>
 <S:Header>
  <wsa:Action>
   http://schemas.xmlsoap.org/ws/2004/08/addressing/fault
  </wsa:Action>
  <!-- Headers elided for clarity. -->
 </S:Header>
 <S:Body>
  <S:Fault>
   <S:Code>
    <S:Value>[Code]</S:Value>   — 260
    <S:Subcode>
     <S:Value>[Subcode]</S:Value>   — 270
    </S:Subcode>
   </S:Code>
   <S:Reason>
    <S:Text xml:lang="en">[Reason]</S:Text>   — 280
   </S:Reason>
   <S:Detail>
    [Detail]   — 290
   </S:Detail>
  </S:Fault>
 </S:Body>
</S:Envelope>
```

METHOD FOR TRANSMITTING WS MESSAGE TO MULTIPLE RECEIVING NODES AND APPARATUS FOR PROCESSING WS MESSAGE

CROSS-REFERENCE TO RELATED APPLICATION

This application claims priority from Korean Patent Application No. 10-2005-0061969 filed on Jul. 9, 2005 in the Korean Intellectual Property Office, the disclosure of which is incorporated herein by reference in its entirety.

BACKGROUND OF THE INVENTION

1. Field of the Invention

Methods and apparatuses consistent with the present invention relate to Web Services (hereinafter, referred to as "WS"), and more particularly, to methods for transmitting a WS message to a plurality of receiving nodes, and apparatuses for processing a WS message.

2. Description of the Prior Art

With the increasing necessity to realize worldwide cooperative electronic environments, it is necessary to provide a next generation electronic automatic business system, and proper facilities for such a system. In order to realize the cooperative electronic environments under this new scheme, a technology called "Web Services" (hereinafter, referred to as "WS") has been developed. In this WS, the "web" represents a typical network and "services" represents a comprehensive concept including not only electronic interfaces but also distributed applications.

A WS corresponds to a program interface for an electronic business system which operates based on various industry standards including Extensible Markup Language (hereinafter, referred to as XML)-based standards, thereby facilitating mutual use of services.

A WS includes both technical contracts and business contracts. The technical contract defines a series of operations and data types used for performing these operations. Further, the technical contract defines protocols for a WS and proper communication models. The business contract defines business-related metadata (e.g. category or taxonomy, support phone numbers) associated to services, service level agreements, licensing models, and others.

For example, a WS may include stock quotations accessible by Universal Resource Locators (URLs), product catalogs published through the Internet, Simple Mail Transfer Protocol (SMTP) message channels, Simple Object Access Protocol (SOAP)-based authentication agents, and Common Object Request Broker Architecture (CORBA) objects. All of these are network-accessible components for performing specific functions; these components may be integrated into a powerful automatic business system.

That is, in the Information Technology (IT) industry, evolution from machine code to programming languages and client-server programming, and further to object-oriented component models has been implemented. Recently, further evolution to service-based distributed applications, which cannot only be used dynamically, but which can also be flexibly combined, has been implemented. A WS corresponds to this service-based distributed application.

For such a WS, various standards such as a WS-Router, a WS-Referring, a WS-Event Scheduling and a WS-Security have been proposed. Among these standards, a WS-Addressing is used for setting transmitting and receiving nodes for a WS message.

When a receiving node is detailed in a WS message by means of a WS-Addressing, a network apparatus (e.g. a gateway or a router), for message relaying, searches for the receiving node detailed in the message. If the network apparatus finds the receiving node, it transfers the message. However, if the network apparatus fails to find the receiving node, it returns an error message. Such WS-Addressing basically considers one-to-one communication while not considering one-to-multiple communication.

With the spread of WS, it is possible to provide and use multilateral services which consider a home network in addition to Business-to-Business (B2B) services and Business-to-Customer (B2C) services. Since WS according to the prior art is based on a one-to-one service call, repeated operations including message generation and transmission must be performed by the number of receiving nodes in order to implement a WS call for the receiving nodes. For example, when a user attempts to check the states of each device constituting a home network by means of an external WS, an external computing device used by the user must repeat a WS call for each device. This may result not only in an increase in the operations of the computing device for processing messages, but also in a waste of network resources.

Korea Unexamined Patent Publication No. 10-2004-39039 (Method and Apparatus for Control Message Multicast in an UPnP-based Network System) discloses protocols defined in a Universal Plug and Play (hereafter, UPnP)-based network, including HTTPMU/SOAP layers on a User Datagram Protocol (hereafter, UDP) layer, which is constructed in such a manner that the same control message is multicast to a plurality of devices. However, since technology disclosed in the Korea publication No. 10-2004-39039 uses general multicast technology, a receiving node of a message may change according to the situation. Therefore, this technology is not suitable for WS environments in which it is difficult to classify the receiving node into a fixed group.

Further, WS-Management provides an event transmission scheme using a multicast, but this is not sufficiently secure. In addition, this is a scheme suitable for a small scale network capable of performing a multicast.

That is, these conventional technologies are not suitable for wide network environments such as the Internet.

SUMMARY OF THE INVENTION

Accordingly, the present invention has been made to address the above-mentioned problems occurring in the prior art. An aspect of the present invention is to simplify message generation and transmission processes when transferring a WS message to a plurality of receiving nodes.

The present invention is not limited the afore-mentioned aspect, and other unmentioned aspects will be apparent to those skilled in the art from the detailed description of the present invention.

According to one aspect of the present invention, there is provided a method for transmitting a Web Services (WS) message to a plurality of receiving nodes, the method including: providing data in a form of a WS message; addressing the receiving nodes to the provided WS message; and transmitting the addressed WS message.

According to an aspect of the present invention, there is provided a method for transmitting a Web Services (WS) message to a plurality of receiving nodes, the method including: receiving a WS message to which the receiving nodes have been addressed; readdressing the received WS message according to the receiving nodes; and transmitting the readdressed WS message.

According to an aspect of the present invention, there is provided an apparatus for processing a Web Services (WS) message, the apparatus including: a message-providing unit for providing data in a form of a WS message; an addressing unit for addressing the receiving nodes to the provided WS message; and a transmission unit for transmitting the addressed WS message.

According to an aspect of the present invention, there is provided an apparatus for processing a Web Services (WS) message, the apparatus including: a reception unit for receiving a WS message to which the receiving nodes have been addressed; a message processing unit for readdressing the received WS message according to the receiving nodes; and a transmission unit for transmitting the readdressed WS message.

BRIEF DESCRIPTION OF THE DRAWINGS

The above and other aspects of the present invention will become more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings.

Advantages and features of the present invention, and methods for achieving them will be apparent to those skilled in the art from the detailed description of the exemplary embodiments together with the accompanying drawings. The scope of the present invention is not limited to the exemplary embodiments disclosed in the specification and the present invention can be realized in various forms. The described present exemplary embodiments are presented only to completely disclose the present invention and to help those skilled in the art to completely understand the scope of the present invention, and the present invention is defined only by the scope of the claims. The same reference numerals are used to designate the same elements throughout the specification and drawings.

Hereinafter, exemplary embodiments of the present invention will be described in detail with reference to the accompanying drawings.

Figure 1:
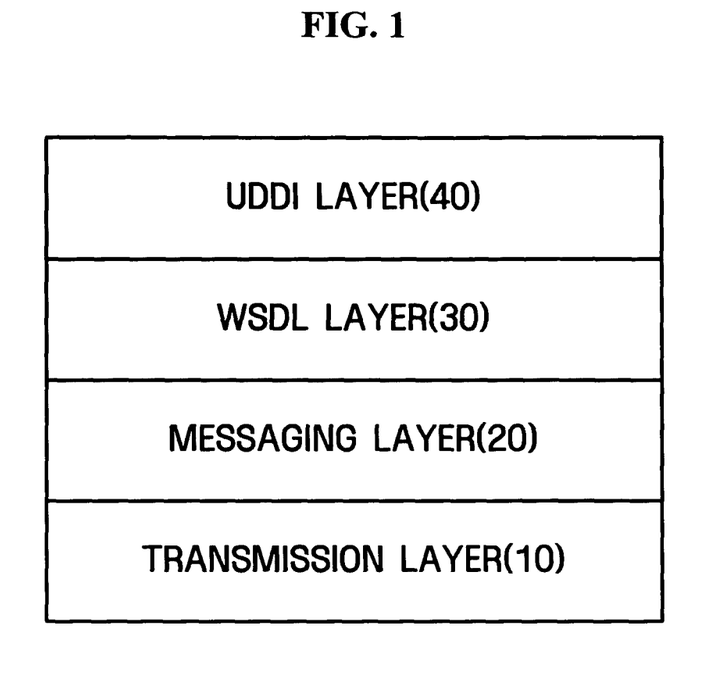
FIG. 1 is a diagram illustrating technical layers according to an exemplary embodiment of the present invention.

FIG. 1 is a diagram illustrating technical layers for Web Services (hereinafter, referred to as "WS") according to an exemplary embodiment of the present invention.

A transmission layer 10 defines a protocol capable of transmitting a message (hereinafter, referred to as "WS message") in WS. For example, the transmission layer 10 can support a protocol capable of transmitting data between computing devices on the web, such as the Hyper Text Transfer Protocol (hereinafter, referred to as "HTTP"), a Simple Mail Transfer Protocol (hereinafter, referred to as "SMTP"), and a File Transfer Protocol (hereinafter, referred to as "FTP"). Preferably, the transmission layer 10 supports HTTP, thereby enabling a web browser to use WS. When WS are provided in an intranet, the transmission layer 10 may also use Java Message Services (JMS).

A messaging layer 20 provides a WS message request and response methods between a WS client and a WS provider over the web. Preferably, the messaging layer 20 supports the Simple Object Access Protocol (hereinafter, referred to as "SOAP") based on the Extensible Markup Language (hereinafter, referred to as "XML") in order to cause a WS message to be freely exchanged between computing devices regardless of platforms or languages for processing the WS message.

A Web Service Description Language (WSDL) layer 30 functions as an interface in order to cause a WS provider to describe WS functions in XML form, and provides information for means by which a WS client calls a WS.

A Universal Description, Discovery, and Integration (hereinafter, referred to as UDDI) layer 40 defines registries of an available WS. A WS provider can reveal itself through the UDDI layer 40 and can open a description for an available service. A WS client can search for a desired WS through the UDDI layer 40.

In the WS structure as described above, when a WS message used for calling and providing a WS is generated, WS-Addressing, which corresponds to a WS messaging standard, is used in order to address a receiving node of the WS message. The present invention relates to this WS-Addressing.

The WS-Addressing defines a standard mechanism for confirmation and exchange for the WS message between various endpoints, thereby supporting construction of reliable and interoperable WS applications. WS-Addressing provides the basis for other WS standards such as WS-Security, WS-ReliableMessaging and WS-Transaction, and it has been proposed as a consistent and interoperable standard for addressing the WS message. The WS-Addressing standard has been published at www.w3.org/2002/wa/addr, which is the basis of the present invention.

Figure 2:
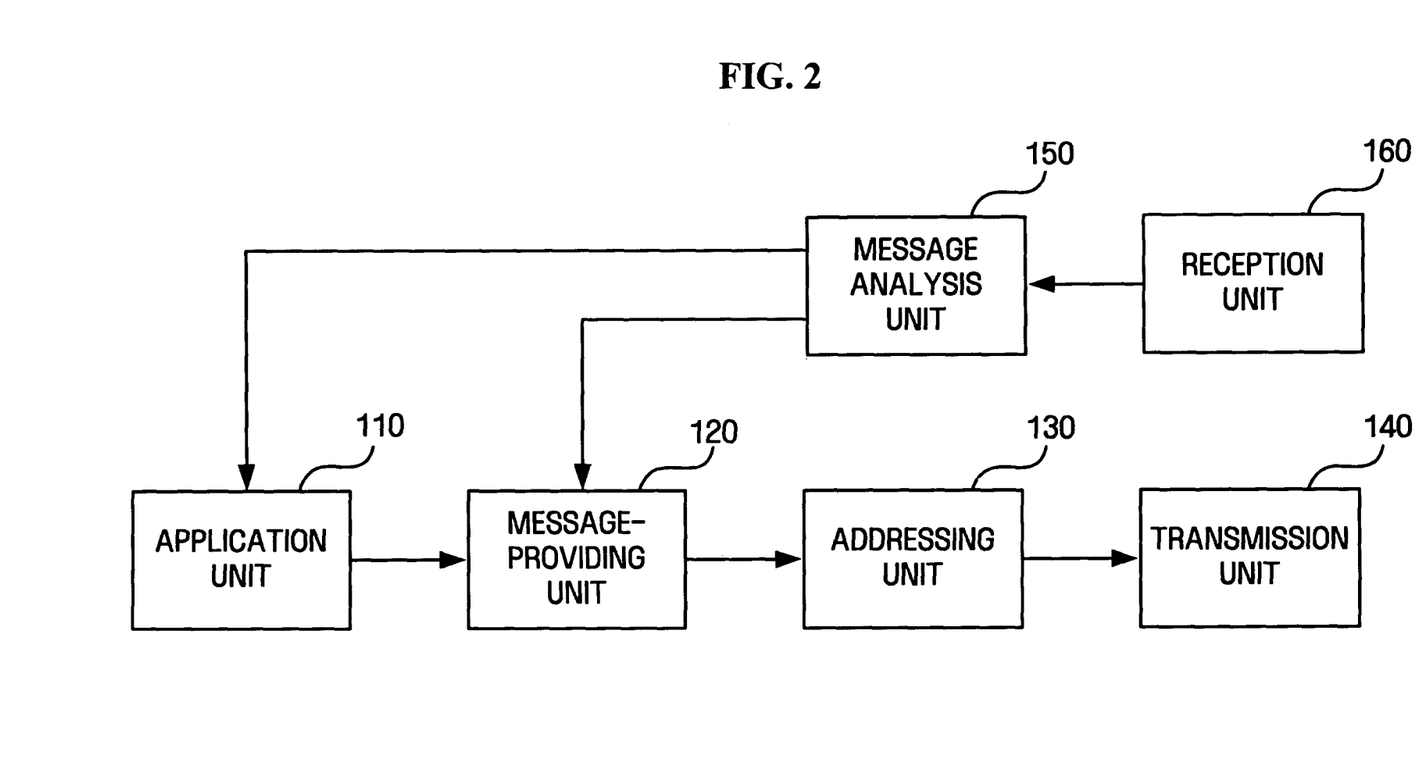
FIG. 2 is a block diagram illustrating a WS message processing apparatus according to an exemplary embodiment of the present invention.

FIG. 2 is a block diagram illustrating a WS message processing apparatus according to an exemplary embodiment of the present invention.

The WS message processing apparatus includes an application unit 110, a message-providing unit 120, an addressing unit 130, a transmission unit 140, a message analysis unit 150 and a reception unit 160. The WS message processing apparatus according to the present exemplary embodiment may be either a transmitting node for generating and transmitting a WS message or a receiving node for receiving the WS message transmitted by the transmitting node. Accordingly, the WS message processing apparatus may function as a WS client or a WS provider.

The message-providing unit 120 provides data, which is transferred from the application unit 110, in the form of a WS message. The data provided from the application unit 110 may change according to a WS to which the application unit 110 is associated.

A WS message provided from the message-providing unit 120 may conform to SOAP, which is based on XML. The message-providing unit 120 may apply a WS standard such as WS-Security and WS-ReliableMessaging in order to maintain the security of the WS message, and reliably transmit the WS message.

The addressing unit 130 addresses a receiving node in the WS message provided by the message-providing unit 120. The addressing operation by the addressing unit 130 may basically conform to the WS-Addressing standard.

As the situation requires, the addressing unit 130 may also address a response receiving node which is to receive the response to the WS message. In the case in which the WS message is transmitted to a plurality of receiving nodes, the addressing unit 130 may also address the receiving nodes in one WS message. This will be described with reference to FIG. 3.

The transmission unit 140 transmits the WS message; the transmission unit 140 may use a data transmission protocol such as an HTTP, SMTP or FTP in order to transmit the addressed WS message.

The reception unit 160 receives a WS message from another computing device using the data transmission protocol (e.g. HTTP, SMTP, or FTP) that has been applied to the received WS message. In the present exemplary embodiment, the reception unit 160 is constructed separately from the transmission unit 140. However, the present invention is not limited to the separate construction. That is, the reception unit 160 may be integrated with the transmission unit 140 in one functional block.

The message analysis unit 150 analyzes the WS message received by the reception unit 160. According to the result of analyzing the WS message, the data included in the WS message may be provided to the application unit 110. If there is an error in the WS message or the WS message has been an erroneously received, the message-providing unit 120 may also generate an error response message for the received WS message. The addressing unit 130 may confirm a response receiving node from the WS message received by the reception unit 160, and address the confirmed response receiving node as a receiving node of the error response message.

Figure 3:
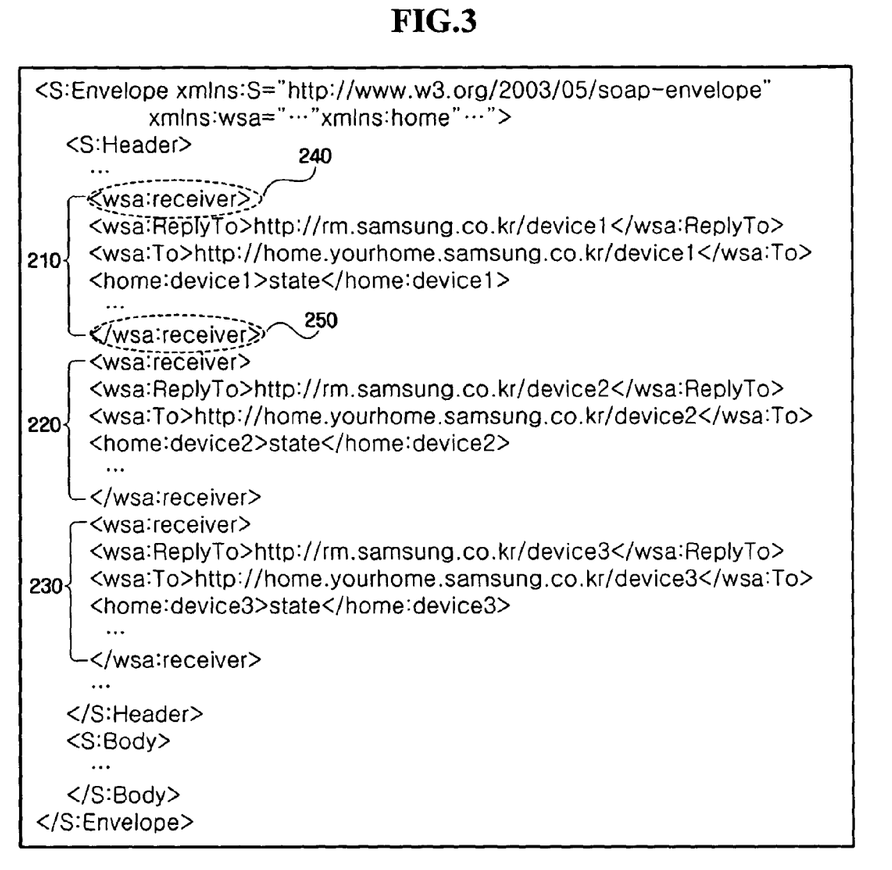
FIG. 3 is a diagram illustrating a WS message according to an exemplary embodiment of the present invention.

FIG. 3 is a diagram illustrating a WS message according to an exemplary embodiment of the present invention.

The WS message of FIG. 3 is addressed to multiple receiving nodes 210, 220, and 230 and a tag 240 "<wsa:receiver>" and a tag 250 "</wsa:receiver>" are used in order to distinguish the receiving nodes. Further, tags and lines necessary for addressing receiving nodes may be inserted according to the WS-Addressing standard. For example, a tag "<wsa:MessageID>" used to distinguish WS messages may be further included.

As illustrated in FIG. 3, the addressing unit 130 has addressed the message from the message-providing unit 120 to the receiving node according to the WS-Addressing standard. Herein, the addressing unit 130 can address one message to multiple receiving nodes.

Figure 4:
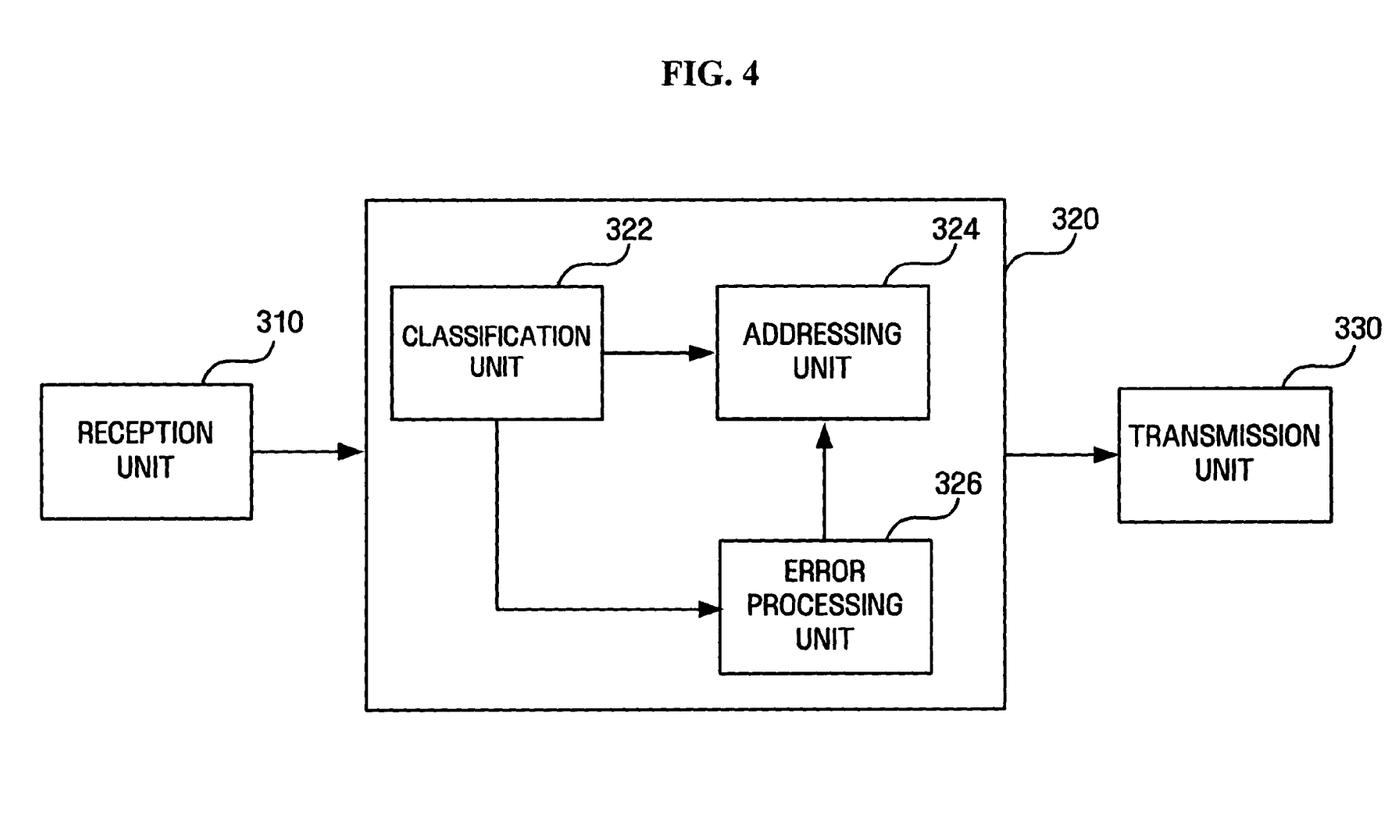
FIG. 4 is a block diagram illustrating a WS message processing apparatus according to an exemplary embodiment of the present invention.

FIG. 4 is a block diagram illustrating a WS message processing apparatus according to an exemplary embodiment of the present invention.

The WS message processing apparatus includes a reception unit 310, a message processing unit 320 and a transmission unit 330. Such a WS message processing apparatus may be included in a network apparatus such as a router and a gateway.

The reception unit 310 receives a WS message from another computing device; the reception unit 310 may use a protocol corresponding to a data transmission protocol (e.g. HTTP, SMTP, or FTP) applied to the received WS message.

The transmission unit 330 transmits a message processed by the message processing unit 320. Here, the transmission unit 330 may use a data transmission protocol such as HTTP, SMTP and FTP in order to transmit the message. In the present exemplary embodiment, the transmission unit 330 is constructed separately from the reception unit 310. However, the present invention is not limited to the separate construction. That is, the transmission unit 330 may be integrated with the reception unit 310 in one functional block.

The message-processor 320 readdresses a WS message, which has been addressed to multiple receiving nodes. Further, the message-processor 320 generates an error response message when an error has been found in the WS message. For this, the message-processor 320 may include a classification unit 322, an addressing unit 324 and an error processing unit 326.

The classification unit 322 classifies the multiple receiving nodes, addressed in the WS message, into predetermined groups. Preferably, the classification unit 322 may confirm routing paths of the receiving nodes, and group the receiving nodes according to network apparatuses (e.g. routers or gateways) to which each receiving node has been connected. That is, the classification unit 322 may classify groups according to receiving nodes connected to the same network apparatus.

The addressing unit 324 addresses receiving nodes to WS messages received in the groups classified by the classification unit 322. As a result of the confirming by the classification unit 322 of the routing paths of the receiving nodes, it is possible to transmit a WS message to multiple receiving nodes without using another network apparatus; here, the addressing unit 324 addresses the WS message to multiple receiving nodes. The addressing operation by the addressing unit 324 may conform to the WS-Addressing standard. This addressing operation will be described in detail with reference to FIGS. 6 and 7.

The error processing unit 326 checks if an error has occurred in the WS message received by the reception unit 310. When an error has occurred in the WS message, the error processing unit 326 generates an error response message. For example, the error processing unit 326 checks the receiving nodes addressed in the WS message received by the reception unit 310. Further, when there is a receiving node whose routing path cannot be understood by the classification unit 322, the error processing unit 326 may generate the error response message.

Figure 5:
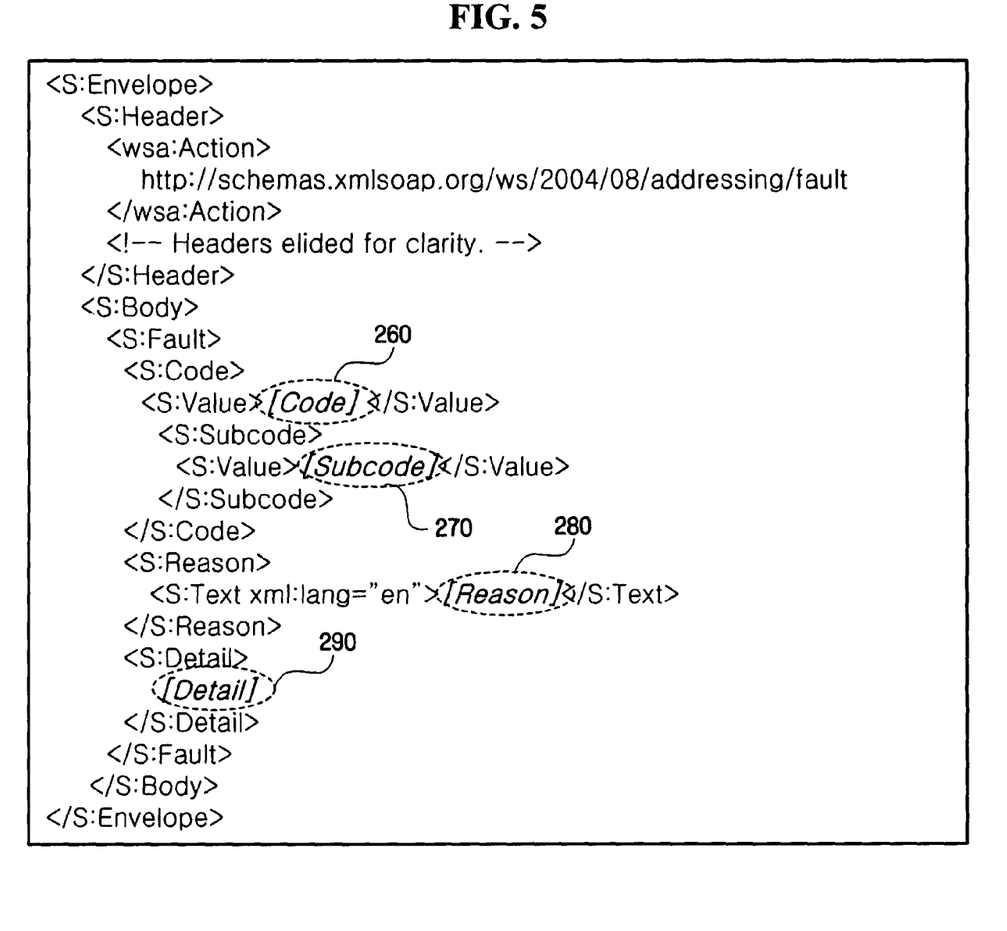
FIG. 5 is a diagram illustrating an error response message according to an exemplary embodiment of the present invention.

If multiple errors are found in the WS message, the error processing unit 326 may collect these errors, and notify a message transmitting node of error occurrence through an error response message. For example, when two or more receiving nodes, whose destinations (i.e., routing paths) cannot be understood by the classification unit 322, have been found in a WS message addressed to multiple receiving nodes, the error processing unit 326 may report the existence of these receiving nodes through an error response message. Herein, the error response message as illustrated in FIG. 5 may be used. In FIG. 5, a code and a sub-code for an error are established in the "[Code]" 260 and "[Subcode]" 270, respectively. Further, contents for the error are established in the "[Reason]" 280 and details for the error are established in the "[Detail]" 290. Furthermore, information (e.g. addresses of the receiving nodes) for multiple receiving nodes whose routing paths cannot be understood is established in the "[Code]" 260 or the "[Detail]" 290. Otherwise, the information may be established using a new separate tag.

Likewise, the error processing unit 326 may collect another type of error (e.g. an error "ActionNotSupported" representing that it is impossible to perform an indicated operation through a WS message in the WS-Addressing standard), and notify of the error occurrence through an error response message. For this, when the reception unit 310 receives one or more error response messages from receiving nodes or another network apparatus, the error processing unit 326 may incorporate these messages into one error response message. It is preferable to incorporate the error response messages according to the same type of error.

In the description of FIGS. 2 and 4, each functional block called a "unit" may be realized as a kind of module. A "module" represents either a software element or a hardware element such as a Field Programmable Gate Array (FPGA) or an Application Specific Integrated Circuit (ASIC), and it performs predetermined functions. The module may also be constructed so that it resides in an addressable storage medium, or so that it executes one or more processors. For example, a module includes elements, such as software elements, object-oriented software elements, class elements and task elements, processes, functions, attributes, procedures, sub-routines, segments of program code, drivers, firmware, microcode, circuits, data, databases, data structures, tables, arrays and variables. Functions provided by elements and modules may be provided either by a small number of combined large elements and combined large modules, or by a larger number of small elements and small modules.

Figure 6:
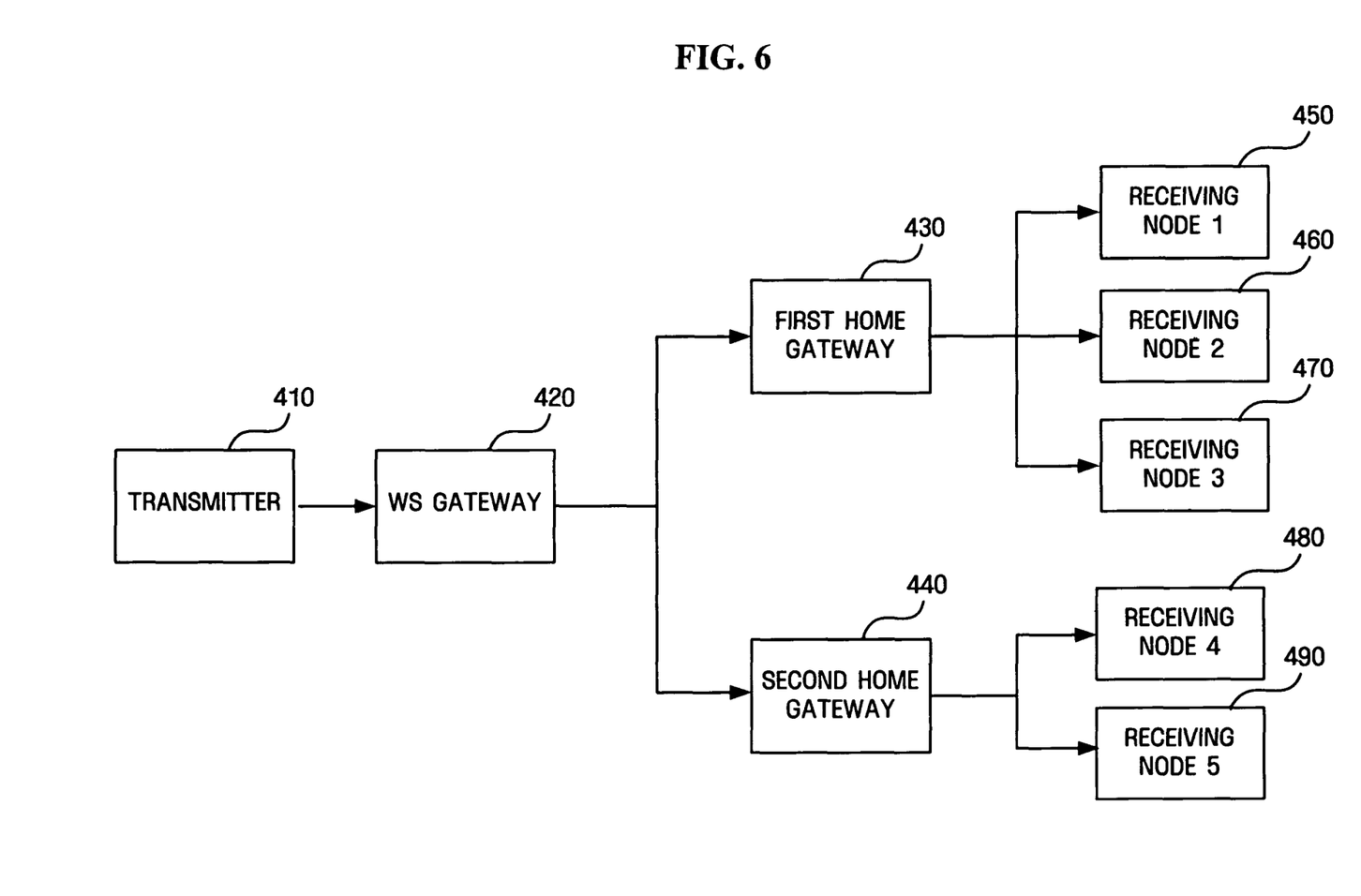
FIG. 6 is a block diagram illustrating a process for transmitting a WS message to multiple receiving nodes.
Figure 7:
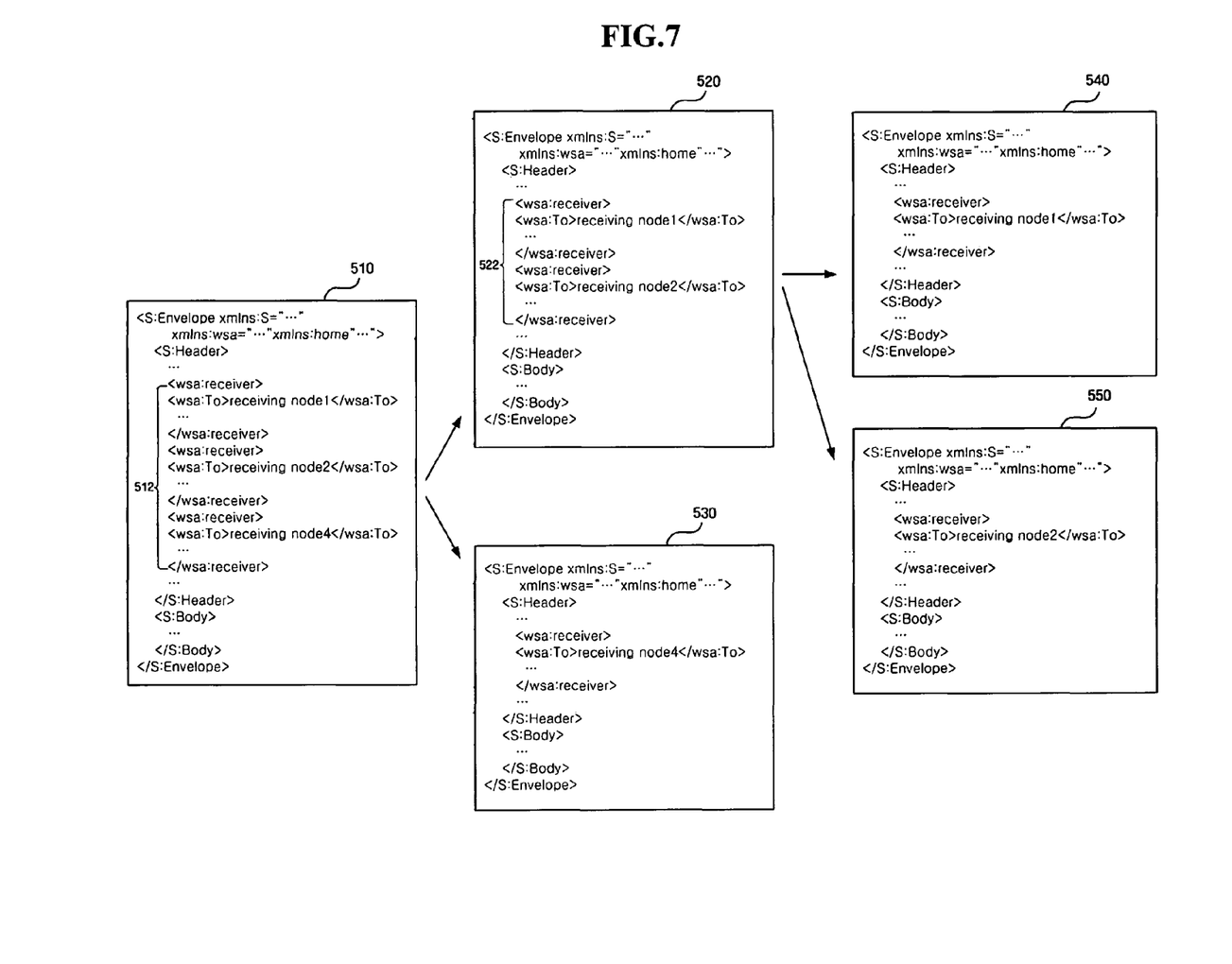
FIG. 7 is a diagram schematically illustrating the WS message transmitted in the process of FIG. 6.

FIG. 6 is a block diagram illustrating a process for transmitting a WS message to multiple receiving nodes, and FIG. 7 is a diagram schematically illustrating the WS message transmitted through the process of FIG. 6.

In FIG. 6, a transmitting node 410 includes the WS message processing apparatus as described in FIG. 2, and a WS gateway 420; a first home gateway 430 and a second home gateway 440 include the WS message processing apparatus as described in FIG. 4.

As illustrated in FIG. 6, a first receiving node 450, a second receiving node 460 and a third receiving node 470 may communicate with the transmitting node 410 through the WS gateway 420 and the first home gateway 430. A fourth receiving node 480 and a fifth receiving node 490 may communicate with the transmitting node 410 through the WS gateway 420 and the second home gateway 440.

When the transmitting node 410 is to transmit a WS message to the first receiving node 450, the second receiving node 460 and the fourth receiving node 480, the transmitting node 410 may generate a first message 510 as illustrated in FIG. 7. In FIG. 7, the first message 510 is addressed to multiple receiving nodes (a first receiving node, a second receiving node and a fourth receiving node 512).

The WS gateway 420 having received the first message 510 from the transmitting node 410 confirms routing paths of the receiving nodes addressed to the first message 510, and groups the receiving nodes according to either the first home gateway 430 or the second home gateway 440 to which the receiving nodes have been connected. That is, the WS gateway 420 classifies the first receiving node 450 and the second receiving node 460, which have been connected to the first home gateway 430, into a separate group different from that of the fourth receiving node 480 connected to the second home gateway 440.

Then, the WS gateway 420 readdresses the first message 510 according to the classified groups. As a result of readdressing the first message 510, it is possible to provide a second message 520 and a third message 530 as illustrated in FIG. 7. The second message 520 or the third message 530 includes the same content (from "<S:Body>" to "</S:Body>") as that of the first message 510. However, the second message 520 is addressed to the first receiving node 450 and the second receiving node 460, and the third message 530 is addressed to the fourth receiving node 480. The WS gateway 420 transmits the second message 520 to the first home gateway 430 while transmitting the third message 530 to the second home gateway 440.

The second home gateway 440 having received the third message 530 may confirm the receiving nodes and transmit the third message 530 to the fourth receiving node 480. Since the third message 530 had been addressed to one receiving node, the second home gateway 440 may transmit the third message 530 to the fourth receiving node 480, as described in the prior art, without performing the readdressing operation.

However, after receiving the second message 520 which is addressed to multiple receiving nodes, the first home gateway 430 readdresses the second message 520 according to the receiving nodes. Since the first receiving node 450 and the second receiving node 460 addressed in the second message 520 may directly communicate with the first home gateway 430 without using another network apparatus, the first home gateway 430 does not group the receiving nodes addressed in the second message 520. That is, the first home gateway 430 addresses the first receiving node 450 and the second receiving node 460 in the second message 520. Accordingly, as illustrated in FIG. 7, it is possible to generate both a fourth message 540 which addressed the first receiving node 450, and a fifth message 550 which addressed the second receiving node 460. The first home gateway 430 transmits the fourth message 540 to the first receiving node 450, and it also transmits the fifth message 550 to the second receiving node 460.

Figure 8:
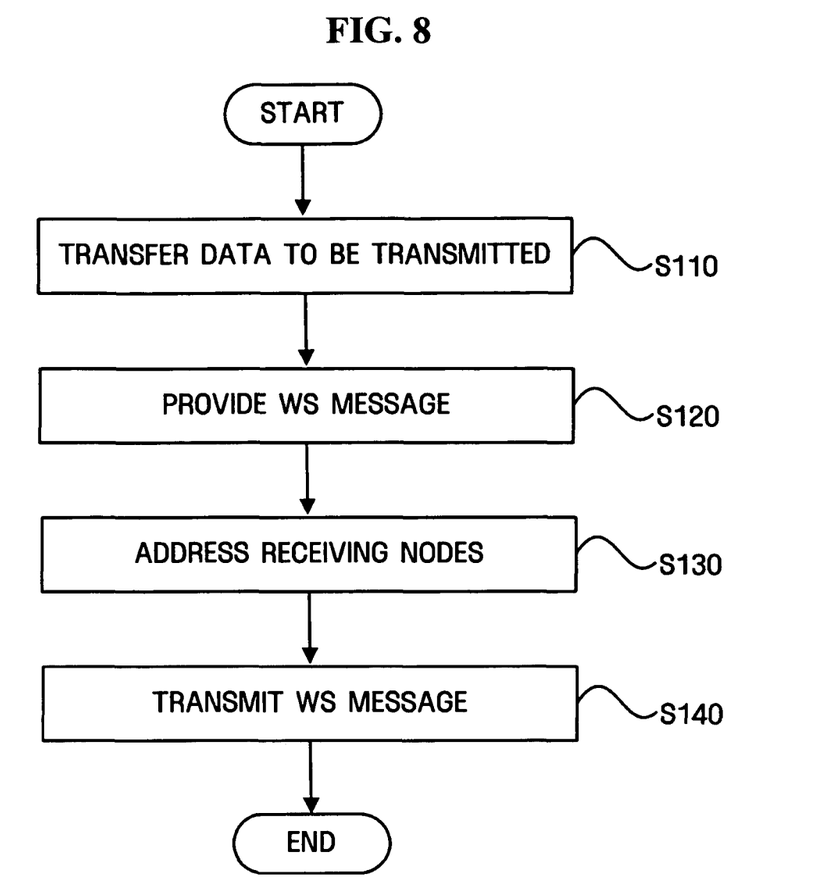
FIG. 8 is a flow diagram illustrating a method for transmitting a WS message to multiple receiving nodes according to an exemplary embodiment of the present invention.

FIG. 8 is a flowchart illustrating a method for transmitting a WS message to multiple receiving nodes according to an exemplary embodiment of the present invention. The present exemplary embodiment represents an operation process of the WS message processing apparatus as described in FIG. 2.

When initial data to be transmitted is transferred from the application unit 110 S110, the message-providing unit 120 provides the received data in the form of a WS message S120. It is preferable for the WS message provided by the message-providing unit 120 to conform to the SOAP, as described above. Further, various WS standards may be applied to the WS message.

When the WS message is provided by the message-providing unit 120, the addressing unit 130 addresses multiple receiving nodes in the WS message S130. One exemplary embodiment of the WS message, which is addressed multiple receiving nodes, is as described in FIG. 3.

Then, the transmission unit 140 transmits the WS message, which is addressed to multiple receiving nodes, over the web S140.

Figure 9:
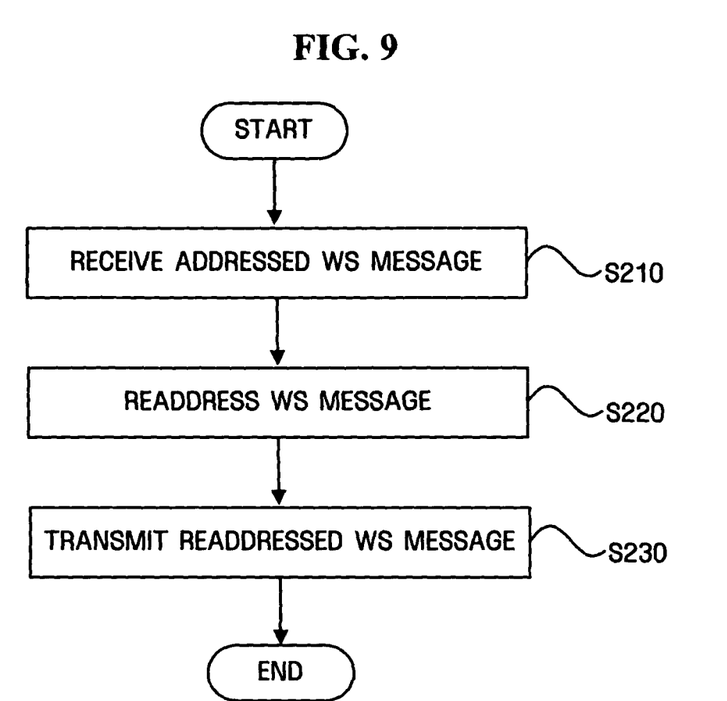
FIG. 9 is a flow diagram illustrating a method for transmitting a WS message to multiple receiving nodes according to an exemplary embodiment of the present invention.

FIG. 9 is a flow diagram illustrating a method for transmitting a WS message to multiple receiving nodes according to an exemplary embodiment of the present invention. The present exemplary embodiment represents an operation process of the WS message processing apparatus as described in FIG. 4.

First, when the reception unit 310 receives a WS message which is addressed to multiple receiving nodes S210, the message processing unit 320 readdresses the WS message according to the receiving nodes S220.

Then, the transmission unit 330 transmits the readdressed WS message over the web S230.

Figure 10:
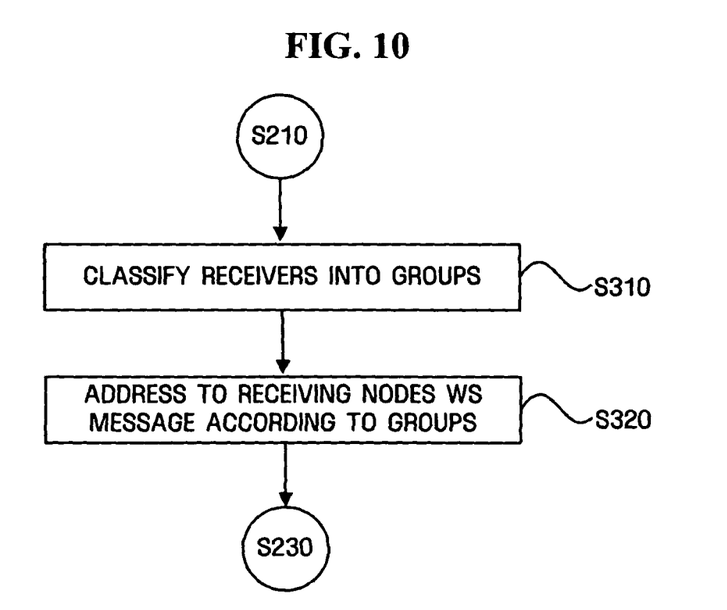
FIG. 10 is a flow diagram illustrating in more detail the readdressing process of FIG. 9.

FIG. 10 is a flow diagram illustrating in more detail the readdressing process S220.

When the WS message, which is addressed to multiple receiving nodes, is received, the classification unit 322 classifies the receiving nodes into predetermined groups S310. Herein, the classification unit 322 may classify the groups according to receiving nodes connected to the same network apparatus.

Then, the addressing unit 324 addresses the WS message, which was received in S210, to the receiving nodes, according to the classified groups S320.

It is preferable that the addressing operation according to an exemplary embodiment shown in FIG. 10 be performed by a WS message processing apparatus, which must transmit a WS message through another network apparatus, such as the WS gateway 420 of the exemplary embodiment of FIG. 6. Accordingly, as in the case of the first home gateway 430 in the exemplary embodiment of FIG. 6, a WS message processing apparatus capable of directly transmitting a WS message to a receiving node may omit the classification process of FIG. 10 S310. The process of FIG. 10 S320 may be replaced with a process in which the addressing unit 324 addresses each receiving node in the WS message received in step 210.

In the meantime, the error processing unit 326 in the message processing unit 320 may perform an operation for checking the received WS message for errors; this will be described with reference to FIG. 11.

Figure 11:
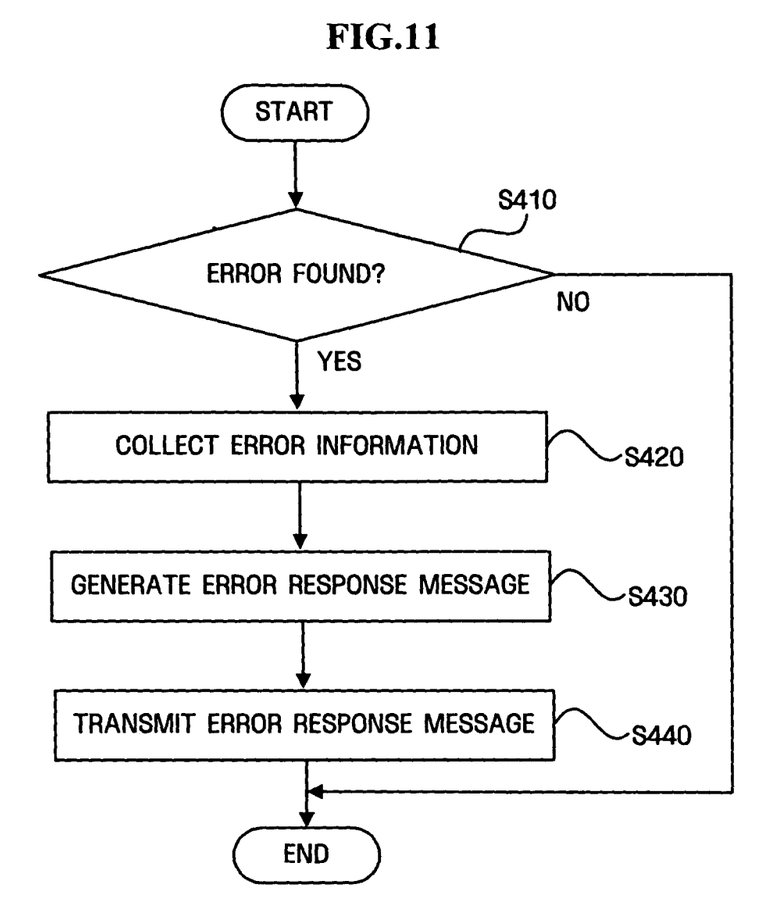
FIG. 11 is a flow diagram illustrating an operation process of an error processing unit according to an exemplary embodiment of the present invention.

FIG. 11 is a flow diagram illustrating an operation process of the error processing unit 326 according to an exemplary embodiment of the present invention.

First, the error processing unit 326 performs an error checking operation S410. This error checking operation may be performed for the WS message received by the reception unit 310 in S210 of FIG. 9. Otherwise, as a result of transmitting the WS message readdressed in S230 of FIG. 9, when the reception unit 310 has received an error response message from the receiving node of the transmitted WS message or another network connection apparatus, the error checking operation may be performed through the received error response message. If errors have been found, the error processing unit 326 collects the found errors S420, and generates an error response message according to the collected errors S430. Herein, if the error checking operation is performed when the reception unit 310 has received the WS message in S210 of FIG. 9, the addressing unit 324 checks a response receiving node of the received WS message, and addresses the response receiving node to a receiving node of the error response message generated by the error processing unit 326. Further, if the error checking operation is performed when the reception unit 310 has received an error response message from the receiving node of the WS message or another network apparatus as a result of transmitting the WS message readdressed in S230 of FIG. 9, the addressing unit 324 may check and address a receiving node intended for reception of the error response message generated by the error processing unit 326 through the received error response message.

Then, the transmission unit 330 transmits the error response message to the web S440. Accordingly, it is possible to synthetically return multiple error occurrence results.

Hereinafter, a detailed exemplary embodiment to which the present invention can be applied will be described with reference to FIGS. 12 and 13.

Figure 12:
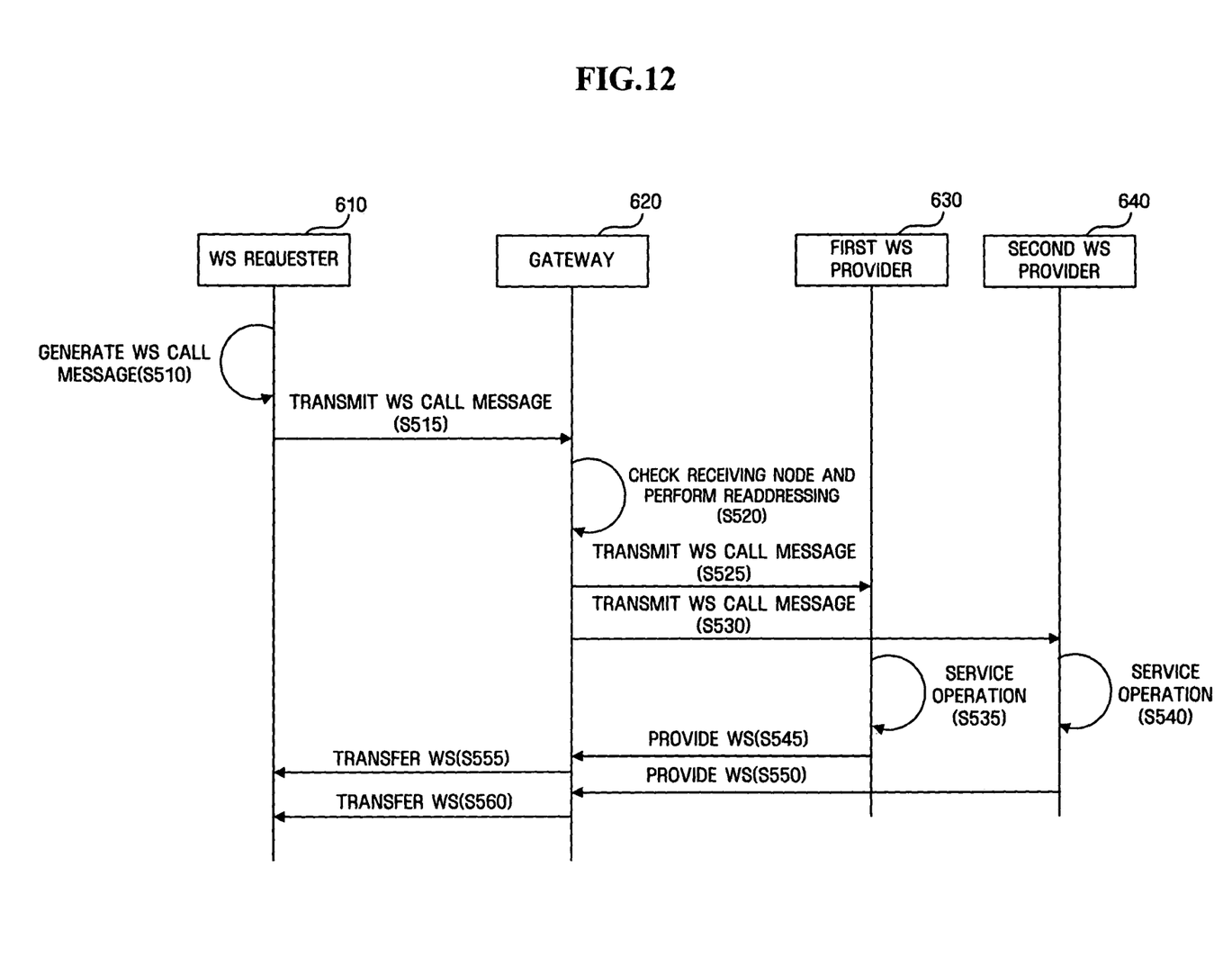
FIG. 12 is a flow diagram illustrating a WS call process according to an exemplary embodiment of the present invention.

FIG. 12 is a flowchart illustrating a WS calling process according to an exemplary embodiment of the present invention.

In the present exemplary embodiment, a WS requester 610 includes the WS message processing apparatus as described in FIG. 2, and a gateway 620 includes the WS message processing apparatus as described in FIG. 4.

The WS requester 610, which requests a first WS provider 630, and a second WS provider 640 to provide web services, generates a WS call message in which the first WS provider 630 and the second WS provider 640 have been addressed as receiving nodes S510.

When the generated WS call message is transmitted to the gateway 620 S515, the gateway 620 checks the receiving node addressed to the WS call message and performs a readdressing operation S520. Herein, it is possible to generate two WS call messages in which the first WS provider 630 and the second WS provider 640 have been addressed as receiving nodes. Further, when an error has been found in the received WS call message, the gateway 620 may generate an error response message for the found error and transmit the error response message to the WS requester 610.

Then, the gateway 620 transmits a WS call message generated according to the readdressing operation to the first WS provider 630 and the second WS provider 640, respectively S525 and S530.

Accordingly, both the first WS provider 630 and the second WS provider 640 perform service operations necessary for web services provided by the first WS provider 630 and the second WS provider 640 S535 and S540, and provide the web services to the WS requester 610 via the gateway 620 S545, S550, S555, and S560.

According to applications of such an exemplary embodiment, a user can check the connection status of home devices in a home network from outside the home. In the prior art, an external computing device used by a user in order to check the connection status of home devices must repeat WS call message generation and transmission processes for all the home devices. However, according to the present invention, only one WS call message is used, so that it is possible to improve the WS call efficiency.

Figure 13:
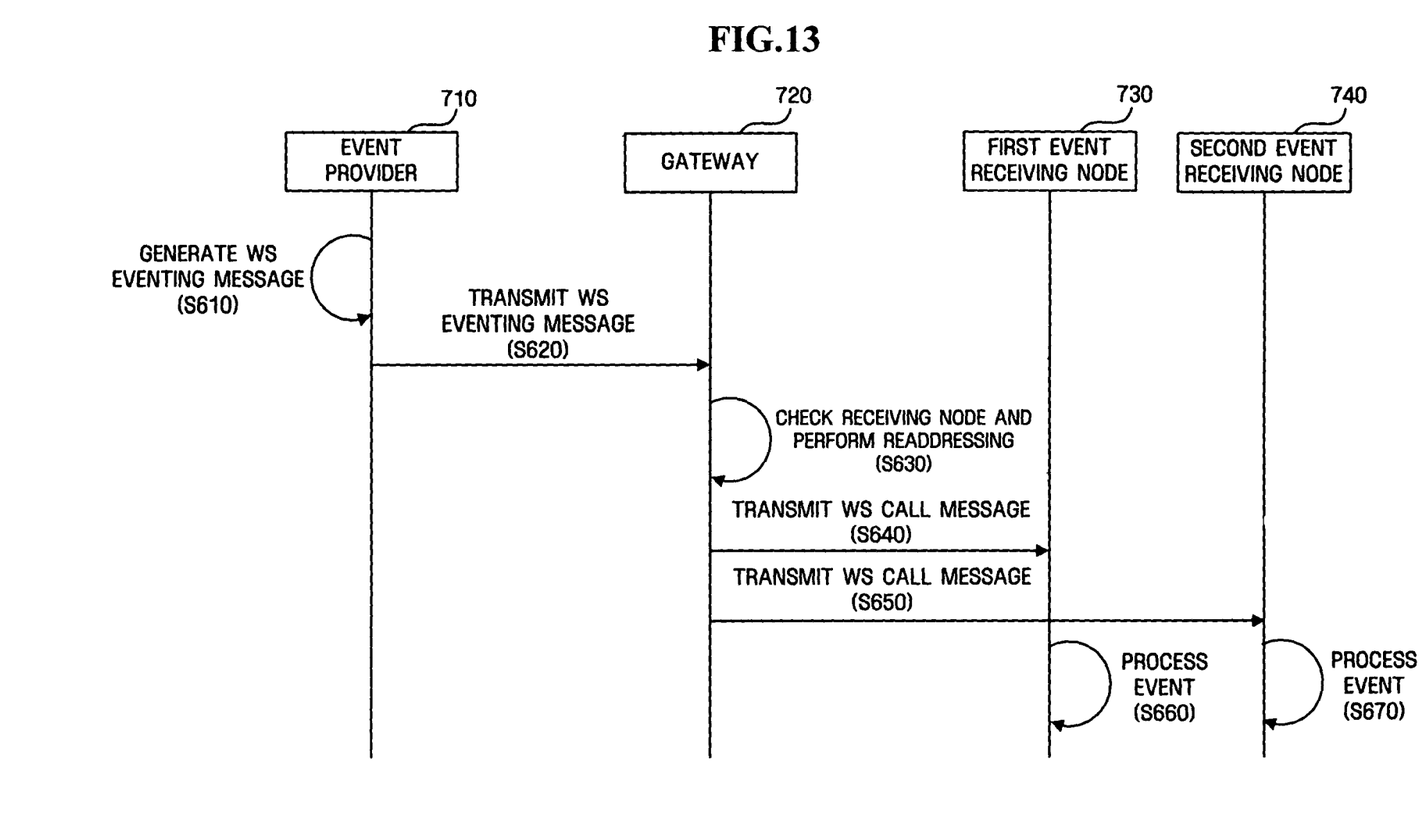
FIG. 13 is a flow diagram illustrating an event transfer process according to an exemplary embodiment of the present invention.

FIG. 13 is a flow diagram illustrating an event transfer process according to an exemplary embodiment of the present invention. FIG. 13 describes a case in which the addressing operation according to the exemplary embodiment of the present invention is applied to WS-Eventing of the WS standard. In the present exemplary embodiment, an event provider 710 includes the WS message processing apparatus as described in FIG. 2, and a gateway 720 includes the WS message processing apparatus as described in FIG. 4.

The event provider 710 provides a specific event to a first event receiving node 730 and a second event receiving node 740, and generates a WS event message, in which the first event receiving node 730 and the second event receiving node 740 have been addressed as receiving nodes S610.

When the generated WS event message is transmitted to the gateway 720 S620, the gateway 720 checks the receiving node addressed in the WS event message and performs a readdressing operation S630. Herein, it is possible to generate two WS event messages in which the first event receiving node 730 and the second event receiving node 740 have been addressed as receiving nodes. Further, when an error has been found in the received WS event message, the gateway 720 may generate an error response message for the found error and transmit the error response message to the event provider 710.

Then, the gateway 720 transmits a WS event message generated according to the readdressing operation to the first event receiving node 730 and the second event receiving node 740 S640 and S650.

Accordingly, both the first event receiving node 730 and the second event receiving node 740 process the received event S660 and S670.

According to a method for transmitting a WS message to multiple receiving nodes and a WS message processing apparatus of the present invention as described above, it is possible to simplify a message generation and transmission processes when transmitting a WS message to multiple receiving nodes.

An exemplary embodiment of the present invention has been described for illustrative purposes, and those skilled in the art will appreciate that various modifications, additions and substitutions are possible, without departing from the scope and spirit of the invention as disclosed in the accompanying claims.

What is claimed is:

1. A method for transmitting a Web Services (WS) message, comprising:
   providing data in the form of a WS message;
   addressing the WS message to a plurality of receiving nodes; and
   transmitting the addressed WS message to the plurality of receiving nodes,
   wherein if multiple errors are found in the WS message addressed to multiple receiving nodes, the multiple errors respectively corresponding to the multiple receiving nodes, collecting the multiple errors, and receiving an error response message based on the multiple errors which reports the existence of the receiving nodes through the error response message,
   wherein the addressing includes initially addressing each individual receiving node's address in one WS message.

2. The method as claimed in claim 1, wherein the provided WS message conforms to simple object access protocol (SOAP) message form.

3. The method as claimed in claim 1, wherein the addressing is performed according to the WS addressing standard.

4. A method for transmitting a Web Services (WS) message, comprising:
   receiving a WS message which has been addressed to each individual address of a plurality of receiving nodes;
   readdressing the received WS message according to the plurality of receiving nodes;
   transmitting the readdressed WS message to the plurality of receiving nodes;
   collecting error information according to the received WS message;
   generating an error response message for the collected error information; and
   transmitting the generated error response message to a WS message requester,
   wherein if multiple errors are found in the WS message, the multiple errors respectively corresponding to the plurality of receiving nodes, information corresponding to the multiple errors is collected, an error response message based on the multiple errors is generated and the error response message is transmitted to a WS message requester.

5. The method as claimed in claim 4, wherein the WS message conforms to the simple object access protocol (SOAP) message form.

6. The method as claimed in claim 4, wherein the readdressing comprises:
   classifying the receiving nodes into groups; and
   addressing the plurality of receiving nodes to the received WS message according to the classified groups.

7. The method as claimed in claim 6, wherein the groups are classified according to network apparatuses to which the plurality of receiving nodes are connected.

8. The method as claimed in claim 6, wherein the addressing is performed according to the WS addressing standard.

9. The method as claimed in claim 4, wherein the readdressing comprises addressing the received WS message to the plurality of receiving nodes.

10. An apparatus for processing a Web Services (WS) message, comprising:
    a message-providing unit which provides data in the form of a WS message;
    an addressing unit which addresses the provided WS message to each individual address of a plurality of receiving nodes;
    a transmission unit which transmits the addressed WS message to the plurality of receiving nodes; and
    a microprocessor which controls the operation of at least one of the message-providing unit, the addressing unit and the transmission unit,
    wherein if multiple errors are found in the WS message addressed to multiple receiving nodes, the multiple errors respectively corresponding to the multiple receiving nodes, the microprocessor further controls operations of collecting the multiple errors, and receiving an error response message based on the collected multiple errors which reports the existence of the receiving nodes through the error response message.

11. The apparatus as claimed in claim 10, wherein the provided WS message conforms to simple object access protocol (SOAP) message form.

12. The apparatus as claimed in claim 10, wherein the addressing unit addresses the provided WS message to the receiving nodes according to the WS addressing standard.

13. The apparatus as claimed in claim 10, further comprising:
    a reception unit which receives a response WS message; and
    a message analysis unit which analyzes the response WS message received by the reception unit and provides data included in the response WS message to the application unit.

14. The apparatus as claimed in claim 13, wherein the reception unit and transmission unit are integrated.

15. An apparatus for processing a Web Services (WS) message, comprising:
    a reception unit which receives a WS message which has been addressed to each individual address of a plurality of receiving nodes;
    a message processing unit which readdresses the received WS message according to the plurality of receiving nodes;
    a transmission unit which transmits the readdressed WS message to the plurality of receiving nodes;
    an error processing unit which collects error information according to the received WS message, generates an error response message for the collected error information, and instructs the transmission unit to transmit the generated error response message to a WS requester;

a processor which controls the operation of at least one of the reception unit, the message processing unit, the transmission unit, and the error processing unit, wherein if multiple errors are found in the WS message, the multiple errors respectively corresponding to the multiple receiving nodes, the error processing unit is configured to collect the multiple errors, and notify a message transmitting node of error occurrence through an error response message based on the multiple errors to the WS requester.

16. The apparatus as claimed in claim 15, wherein the WS message conforms to simple object access protocol (SOAP) message form.

17. The apparatus as claimed in claim 15, wherein the message processing unit comprises:

a classification unit which classifies the receiving nodes into groups; and an addressing unit which addresses the plurality of receiving nodes to the received WS message according to the classified groups.

18. The apparatus as claimed in claim 17, wherein the classification unit classifies the plurality of receiving nodes according to the network apparatus to which the plurality of receiving nodes are connected.

19. The apparatus as claimed in claim 17, wherein the addressing unit addresses the received WS message to the plurality of receiving nodes according to WS addressing standard.

20. The apparatus as claimed in claim 15, wherein the message processing unit addresses the received WS message to the plurality of receiving nodes.

21. The apparatus as claimed in claim 15, wherein the receiving unit and transmitting unit are integrated.

* * * * *